US009557099B2

(12) United States Patent
Wang et al.

(10) Patent No.: US 9,557,099 B2
(45) Date of Patent: Jan. 31, 2017

(54) OPTICAL LENS AND LIGHTING DEVICE

(71) Applicant: The Hong Kong Polytechnic University, Kowloon, Hong Kong (CN)

(72) Inventors: Bo Wang, Hong Kong (CN); Suet To, Hong Kong (CN); Ka Chun Cheung, Hong Kong (CN); Wen Kui Wang, Hong Kong (CN)

(73) Assignee: THE HONG KONG POLYTECHNIC UNIVERSITY, Kowloon, Hong Kong (CN)

( * ) Notice: Subject to any disclaimer, the term of this patent is extended or adjusted under 35 U.S.C. 154(b) by 0 days.

(21) Appl. No.: 14/261,868

(22) Filed: Apr. 25, 2014

(65) Prior Publication Data

US 2015/0308653 A1 Oct. 29, 2015

(51) Int. Cl.

*F21V 5/04* (2006.01)
*F25D 27/00* (2006.01)
*G02B 3/02* (2006.01)
*F21Y 101/00* (2016.01)

(52) U.S. Cl.

CPC ............... *F25D 27/00* (2013.01); *F21V 5/046* (2013.01); *F21Y 2101/00* (2013.01)

(58) Field of Classification Search

CPC ........... G02B 3/0037; G02B 3/02; G02B 3/04; G02B 3/06; G02B 3/08; G02B 19/0004–19/0014; F21D 27/00; F21V 5/046

USPC ..................................................... 362/311.02

See application file for complete search history.

(56) References Cited

U.S. PATENT DOCUMENTS 7,985,009 B2 * 7/2011 Ho ............................ F21V 5/04 362/326
8,585,239 B1 * 11/2013 Tseng ........................ F21V 5/04 362/244
2010/0073937 A1 * 3/2010 Ho ............................ F21V 5/04 362/335
2010/0238669 A1 * 9/2010 Holder ...................... F21K 9/00 362/311.02

* cited by examiner

*Primary Examiner* — Karabi Guharay
*Assistant Examiner* — Nathaniel Lee
(74) *Attorney, Agent, or Firm* — Leydig, Voit & Mayer

(57) ABSTRACT

An optical lens for a light source has an incidence surface receiving light rays emitted from a light source and an aspherical emitting surface optically coupled with the incidence surface for receiving light rays from the incidence surface and emitting light rays received from the incidence surface. The incidence surface defines a cavity for receiving the light source. An opaque or semi-opaque bottom surface adjoins the incidence surface and emitting surface. A lighting device has a substrate, a lighting source located on the substrate, and the optical lens located with the substrate and enclosing the lighting device. A strip light has an elongate substrate having light sources and respective lenses distributed longitudinally along the substrate. Such a strip light using the lens is suitable for lighting the interior of a commercial or domestic refrigerator, chillier cabinet, or other enclosure.

15 Claims, 6 Drawing Sheets

OPTICAL LENS AND LIGHTING DEVICE

FIELD OF THE INVENTION

Figure 1:
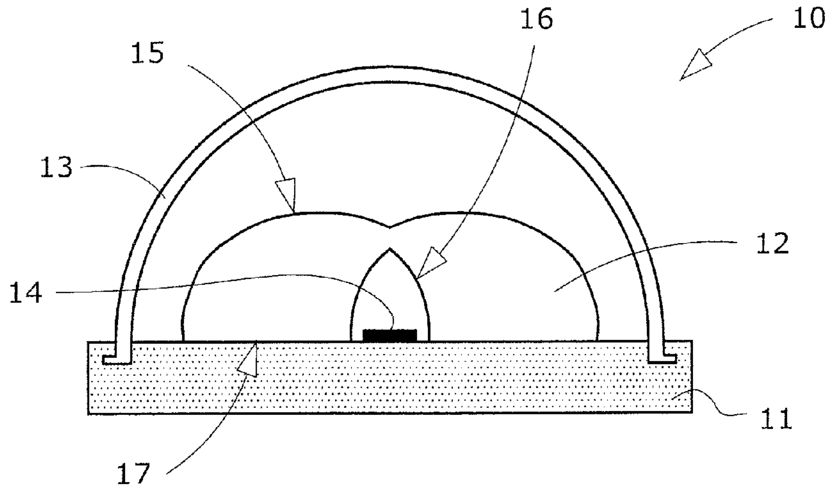

The present invention relates to a lighting device and in particular to an optical lens for a lighting device. More particularly, the present invention relates to a lens for a lighting device used on a confined enclosure such as a domestic or commercial refrigerator.

BACKGROUND

Light sources such as filament or fluorescent lamps are commonly used in enclosures such as refrigerators. These lamps have many shortcomings. For example they are quite bulky, have high energy consumption, low brightness, non-uniform light distribution including having shadow areas and generate heat. The use of LEDs ameliorates some of these problems. Although LEDs solve heating problems, they still have disadvantages such as brightness on the front, side light-leaking, structural complexity and cost.

SUMMARY OF THE INVENTION

It is an objection of the present invention to provide a lighting device, and in particular a lens for a lighting device which overcomes, or at least ameliorates, disadvantages of known lighting devices, and in particular LED lighting devices.

According to a first aspect of the invention there is provided an optical lens for a light source, comprising an incidence surface defining a cavity for containing a light source and receiving light rays emitted from the light source, an aspherical emitting surface optically coupled with the incidence surface for receiving light rays from the incidence surface and emitting light rays received from the incidence surface, and a base surface adjoining the incidence surface and emitting surface, the base surface has at least a semi-opaque finish.

According to a second aspect of the invention there is provided a lighting device comprising a substrate, a lighting source located on the substrate, and the optical lens located with the substrate and enclosing the lighting device.

Preferably, the lens has a central axis concentric with the incident surface and emitting surface, and a first plane intersecting the axis, wherein the incident surface has a profile in the first plane adapted to bend light rays passing through the incident surface away from the axis.

Preferably, the incident surface has a profile in the first plane adapted to bend light rays passing through the incident surface by an angle of between 0-degrees and 20-degrees.

Preferably, the lens has a second plane intersecting the axis, the second plane orthogonal to the first plane, and wherein the incident surface has a semi-circular profile in the second plane.

Preferably, the emitting surface has a first portion adapted to bend light rays passing through the first portion of the emitting surface away from the axis, and a second portion adapted to bend light rays passing through the second portion of the emitting surface towards from the axis, and wherein the second portion is adjacent the base surface.

Preferably, the first portion of the emitting surface is adapted to bend light rays passing through the first portion by an angle of between 0-degrees and 60-degrees in the first plane.

Preferably, the second portion of the emitting surface is adapted to bend light rays passing through the second portion by an angle of between 0-degrees and 20-degrees in the first plane.

Preferably, the emitting surface is adapted to focus light rays passing through the emitting surface in the second plane to within an arc of between −50-degrees and +50-degrees either side of the axis.

Preferably, the aspherical emitting surface has a symmetrical shape.

Preferably, the base surface is dulled, frosted, hazy, serrated, dimpled or textured finish, or a combination thereof.

Further aspects of the invention will become apparent from the following description which is given by way of example only and with reference to the accompanying drawings in which:

BRIEF DESCRIPTION OF DRAWING FIGURES

Figure 2:
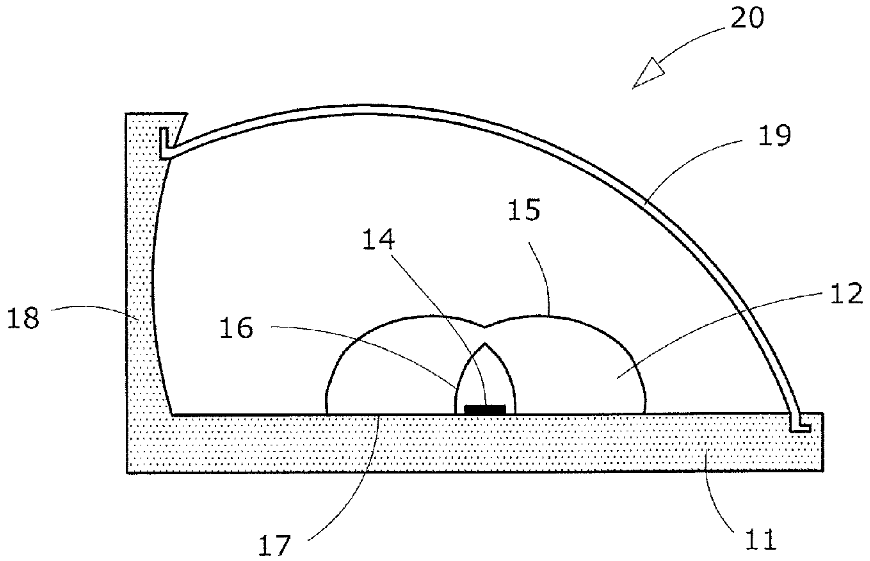
Figure 3:
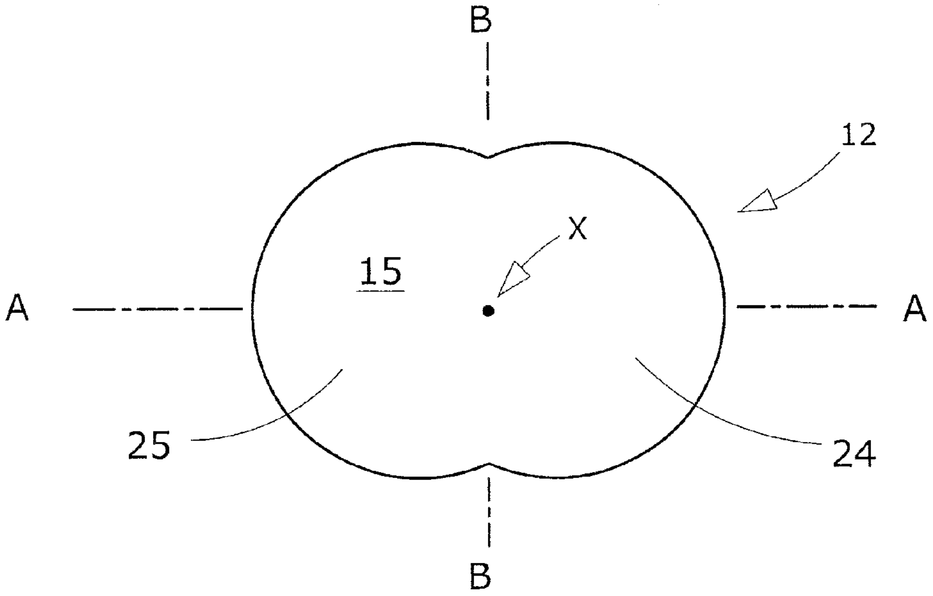
Figure 4:
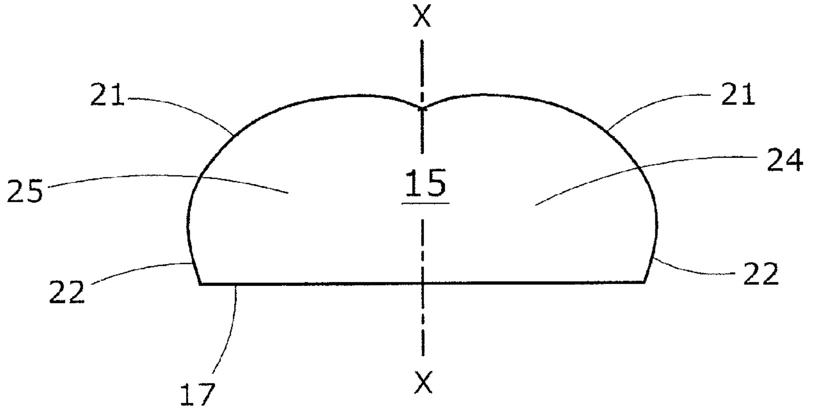
Figure 5:
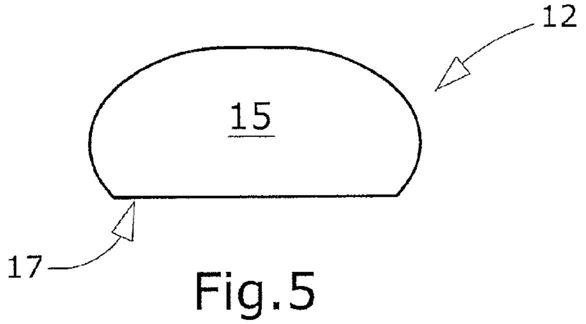
Figure 6:
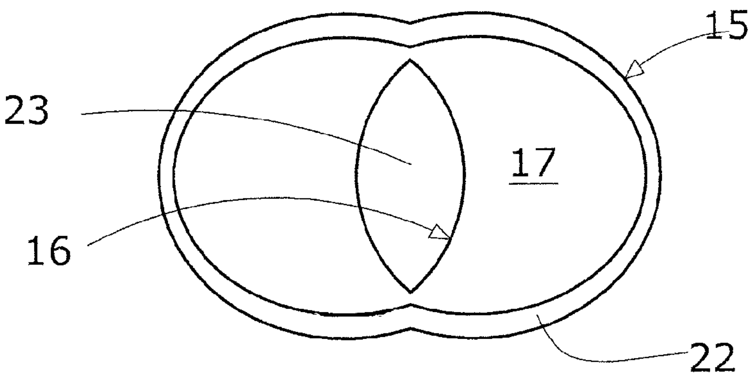
Figure 7:
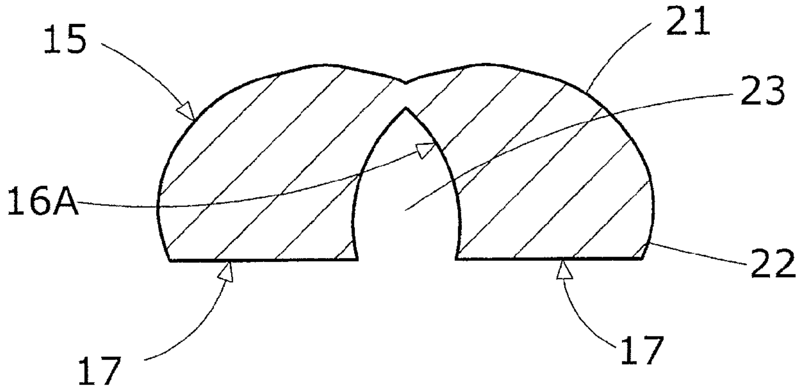
Figure 8:
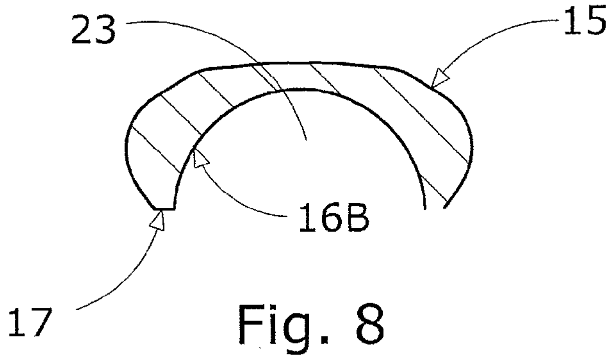
Figure 9:
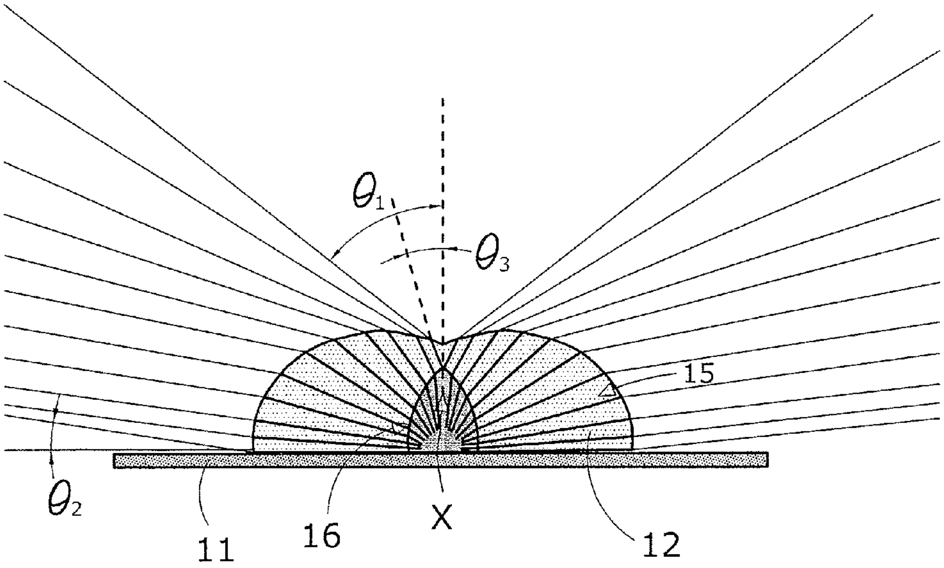
Figure 10:
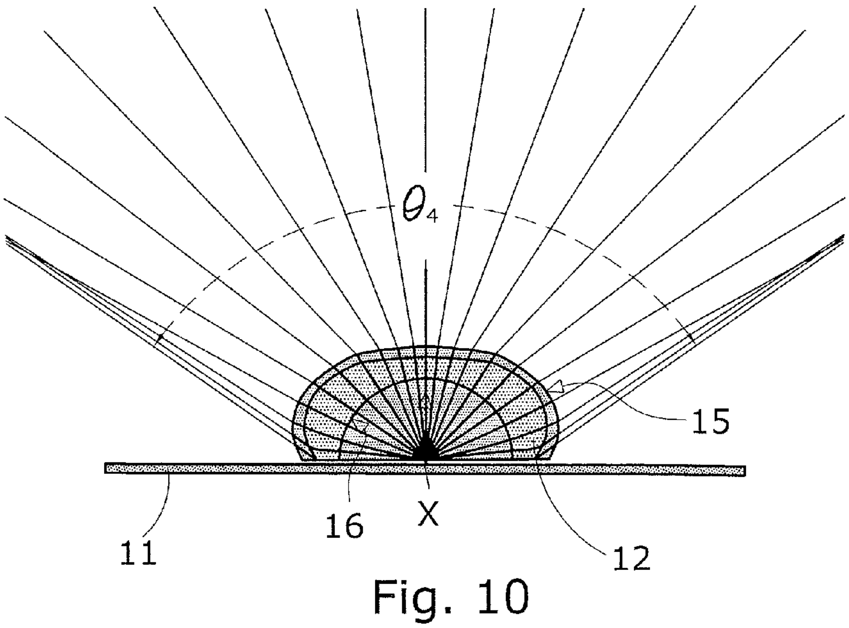
Figure 11:
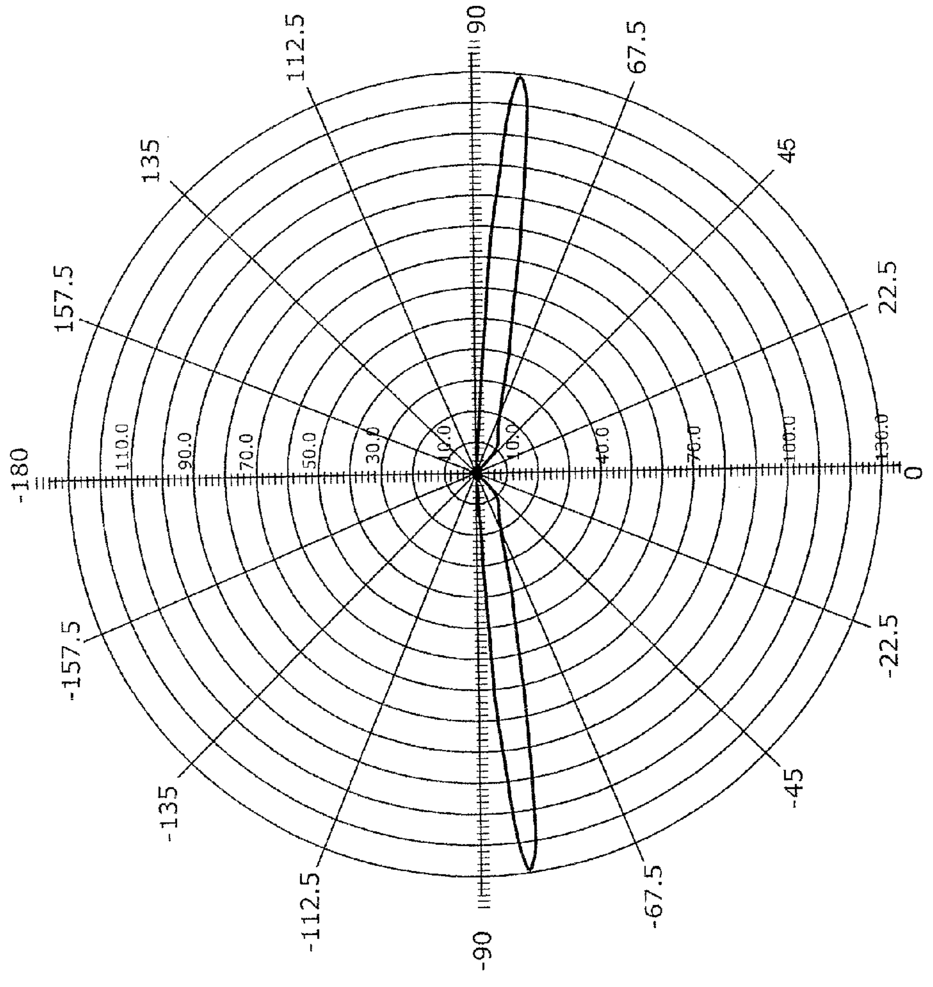
Figure 12:
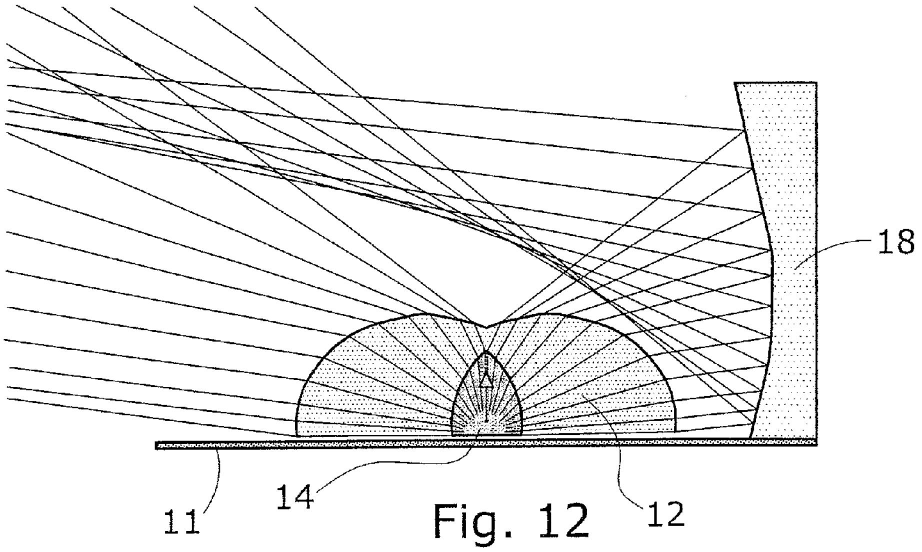

FIG. 1 is a first embodiment of a lighting device employing a lens according to the invention, FIG. 2 is a second embodiment of a lighting device employing a lens according to the invention, FIG. 3 is a top view of a lens according to the invention, FIG. 4 is a first side view of the lens, FIG. 5 is a second side view of the lens, FIG. 6 is a bottom view of the lens, FIG. 7 is a first cross-section view through a first plane A-A of the lens, FIG. 8 is a second cross-section view through a second plane B-B of the lens, FIG. 9 is a first view of the lighting device of FIG. 1, showing refraction of light rays by the lens surfaces parallel the first plane, FIG. 10 is a second view of a lighting device of FIG. 1, showing refraction of light rays by the lens surfaces parallel the second plane, FIG. 11 is an intensity mesh plot of the lens, and FIG. 12 is a view of a lighting device of FIG. 2, showing refraction of light rays by the lens surfaces parallel the first plane.

DETAILED DESCRIPTION

The following description is given by way of example only to illustrate preferred embodiments of the invention. In particular, the language and terminology used is for descriptive purposes only and is not intended to limit the scope or functionality of the invention. The invention may be employed in various combinations or embodiments utilising various elements and means not explicitly described herein, but within the knowledge and skill of one ordinarily skilled in the art.

According to a first particular embodiment of the invention there is a lighting device 10, as illustrated in FIG. 1, which comprises a base or substrate 11, a lighting source such as an LED 14 located on the substrate, and an optical lens 12 located on the substrate 11 and enclosing the lighting device 14. A transparent or translucent cover 13 is optionally provided over the lens. The first lighting device 10 provides an approximately 100-degree to 180-degree arc of light spanning both lateral sides and above, or below depending on the orientation of the device, the lens 12. FIG. 2 shows a second particular embodiment of a lighting device 20. The second light device 20, in similar manner, comprises a base or substrate 11, a lighting source such as an LED 14 located on the substrate, and an optical lens 12 located on the substrate 11 and enclosing the lighting device 14. The second lighting device 20 additionally comprises a concave reflector 18 to one side of the lens 12 and a transparent or translucent cover 19 optionally provided over the lens 12 between the reflector and base 11. The second lighting device 20, via the lens and reflector 18, provides an arc directed to one lateral side of the lens 12 opposite the reflector 18. In both embodiments the base 11 and transparent or translucent cover 13, 19 may be an elongate strip having a plurality of lighting devices 14 each with its own lens 12 arranged in longitudinally spaced positions along the elongate base strip 11. As will be obvious to the skilled addressee, the second lighting device 20 additionally has an elongate reflector strip 18. Such elongate strip lights may be useful in lighting the interior of commercial or domestic cabinets, refrigerators or chillier cabinets. A strip light of the first device type 10 is useful as a centre lighting device, and a strip light of the second device type 20 is useful as an end or edge lighting device located at a front of back edge or end of the cabinet or lighted space.

In both embodiments of the light device 10, 20 the lens 12 has a first incidence surface 16 defining a cavity 23 having an open end for receiving and containing the light source 14. Light rays emitted from the light source 14 are received by the lens via the first incidence surface 16. The lens also has an aspherical emitting surface 15 optically coupled with the incidence surface 16 via a light-transmitting material such as silicone, epoxy, glass or plastic for receiving light rays from the incidence surface 16 and emitting light rays received from the incidence surface 16 outwardly of the lens. In a first plane A-A the aspherical emitting surface 15 has the form of two overlapped convex semi-spherical regions 24, 25 partially overlapping each other around a central axis X concentric with the incident surface 16 and emitting surface 15. In a second plane B-B, orthogonal to the first plane A-A, the aspherical emitting surface 15 has a single convex or semi-oval profile. The lens is symmetrical in both the first and second planes. A base surface 17 adjoins the incidence surface 16 and emitting surface 15. The base surface 17 has an opaque or semi-opaque finish, such as a dulled, frosted, hazy, serrated, dimpled or textured finish, or a combination such finishes.

Referring to FIGS. 7 and 9, in the first plane A-A the incident surface 16A has two concave profiles intersecting at the axis X and diverging from the axis X towards the bottom surface 17 the diverging concave profiles of the incident surface define the cavity 23. The two intersecting concave profiles are adapted to bend light rays from the LED 14 passing through the incident surface 16A in the first plane A-A away from the central axis X by a first angle of between 0-degrees and 20-degrees with respect the axis X. Referring to FIGS. 8 and 10, in the second plane B-B the incident surface 16B has a semi-circular profile adapted to allow light rays from the LED 14 to pass through the incident surface 16B without bending in the second plane B-B.

The emitting surface 15 has a first convex surface portion 21 adapted to bend light rays received from the incident surface 16 and emitted via the first convex surface portion 21 in the first plane A-A in a first direction away from the axis X by a first angle theta-1 of between 0-degrees and 60-degrees with respect to the axis X. The emitting surface 15 has a second convex surface portion 22 adjacent to the bottom surface 17. The second convex surface portion 22 is adapted to bend light rays received from the incident surface 16 and emitted via the second convex surface portion 22 in the first plane A-A in a second direction towards the axis X by a second angle theta-2 of between 0-degrees and 20-degrees with respect to the bottom surface 17. Referring to FIG. 10, in the second plane B-B the first and second convex surface portions 21, 22 are adapted to focus light rays passing through the first and second convex surface portions 21, 22 in the second plane B-B to within an arc angle theta-4 of between −50-degrees and +50-degrees either side of the axis X.

The light intensity mesh for the lens is shown in FIG. 11. The lens provides an application specific intensity mesh with little illumination on the front of lens (at O-degrees) and uniform light pattern for a limited short distance to the lateral sides of the lens (at +/−90 degrees). Such a lens is beneficially suitable for an elongate strip light for use in lighting the interior of commercial or domestic cabinets, refrigerators or chillier cabinets. FIG. 12 shows the light emitting pattern of the second lighting device including a concave reflector 18 to one side of the lens 12. The second lighting device 20, via the lens and reflector 18, provides an arc directed to one lateral side of the lens 12 opposite the reflector 18. Both the first and second types of lighting device 10, 20 us the same lens 12. The light intensity mesh for the second lighting device 20 is identical to one half of the light intensity mesh for the lens is shown in FIG. 11.

What is claimed is:

1. An optical lens for a light source, the optical lens comprising:
- an incidence surface defining a cavity for containing a light source and receiving light rays emitted from the light source,
- an aspherical emitting surface optically coupled with the incidence surface for receiving light rays from the incidence surface and emitting the light rays received from the incidence surface, and
- a base surface adjoining the incidence surface and the aspherical emitting surface, wherein
  - the base surface has at least a semi-opaque finish,
  - the optical lens has
    - a central axis about which the incidence surface and the aspherical emitting surface are concentric,
    - a first plane intersecting the central axis, and
    - a second plane intersecting the central axis,
  - the second plane is orthogonal to the first plane,
  - the incidence surface has a semi-circular profile in the second plane, and
  - the incidence surface has a profile, in the first plane, bending light rays, passing through the incidence surface, away from the central axis.

2. The optical lens of claim 1, wherein the incidence surface has a profile, in the first plane, bending light rays passing through the incidence surface by an angle in a range from 0 degrees to 20 degrees.

3. The optical lens of claim 1, wherein
- the aspherical emitting surface has
  - a first portion bending light rays, passing through the first portion of the aspherical emitting surface, away from the central axis, and
  - a second portion bending light rays, passing through the second portion of the aspherical emitting surface, towards the central axis, and
- the second portion is adjacent the base surface.

4. The optical lens of claim 3, wherein the first portion of the aspherical emitting surface bends light rays passing through the first portion by an angle in a range from 0 degrees to 60 degrees, in the first plane.

5. The optical lens of claim 3, wherein the second portion of the aspherical emitting surface bends light rays passing through the second portion by an angle in a range from 0 degrees to 20 degrees, in the first plane.

6. The optical lens of claim 3, wherein the aspherical emitting surface focuses light rays passing through the aspherical emitting surface, in the second plane, within an arc in a range from −50 degrees to +50-degrees and extending on both sides of the central axis in the second plane.

7. The optical lens of claim 1, wherein the aspherical emitting surface has a symmetrical shape.

8. A lighting device comprising:

a substrate, a light source located on the substrate, and an optical lens located with the substrate and enclosing the lighting device, the optical lens comprising an incidence surface defining a cavity containing the light source and receiving light rays emitted from the light source, an aspherical emitting surface optically coupled with the incidence surface for receiving light rays from the incidence surface and emitting the light rays received from the incidence surface, and a base surface adjoining the incidence surface and the aspherical emitting surface, wherein the base surface has at least a semi-opaque finish, the optical lens has a central axis about which the incidence surface and the aspherical emitting surface are concentric, a first plane intersecting the central axis, and a second plane intersecting the central axis, the second plane is orthogonal to the first plane, the incidence surface has a semi-circular profile in the second plane, and the incidence surface has a profile, in the first plane, bending light rays, passing through the incidence surface, away from the central axis.

9. The lighting device of claim 8, wherein the incidence surface has a profile, in the first plane, bending light rays passing through the incidence surface by an angle in a range from 0 degrees to 20 degrees.

10. The lighting device of claim 8, wherein the aspherical emitting surface has a first portion bending light rays, passing through the first portion of the aspherical emitting surface, away from the central axis, and a second portion bending light rays passing through the second portion of the aspherical emitting surface, towards the central axis, and the second portion is adjacent the base surface.

11. The lighting device of claim 10, wherein the first portion of the aspherical emitting surface bends light rays passing through the first portion by an angle in a range from 0 degrees to 60 degrees, in the first plane.

12. The lighting device of claim 10, wherein the second portion of the aspherical emitting surface bends light rays passing through the second portion by an angle in a range from 0 degrees to 20 degrees, in the first plane.

13. The lighting device of claim 10, wherein the aspherical emitting surface focuses light rays passing through the aspherical emitting surface, in the second plane, within an arc in a range from −50 degrees to +50-degrees and extending on both sides of the central axis in the second plane.

14. The lighting device of claim 8, wherein the aspherical emitting surface has a symmetrical shape.

15. The lighting device of claim 8, wherein the base surface has a dulled, frosted, hazy, serrated, dimpled or, textured finish, or a combination thereof.

* * * * *